US011928123B2

(12) United States Patent
Vázquez Martínez et al.

(10) Patent No.: US 11,928,123 B2
(45) Date of Patent: Mar. 12, 2024

(54) SYSTEMS AND METHODS FOR NETWORK EXPLAINABILITY

(71) Applicant: Virtualitics, Inc., Pasadena, CA (US)

(72) Inventors: Héctor Javier Vázquez Martínez, Pasadena, CA (US); Sagar Indurkhya, Pasadena, CA (US); Gennaro Zanfardino, Pasadena, CA (US); Aakash Indurkhya, Pasadena, CA (US); Sarthak Sahu, Pasadena, CA (US); Ciro Donalek, Pasadena, CA (US); Michael Amori, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 17/810,595

(22) Filed: Jul. 2, 2022

(65) Prior Publication Data

US 2023/0004557 A1    Jan. 5, 2023

Related U.S. Application Data

(60) Provisional application No. 63/235,082, filed on Aug. 19, 2021, provisional application No. 63/218,201, filed on Jul. 2, 2021.

(51) Int. Cl.
*G06F 16/00* (2019.01)
*G06F 16/248* (2019.01)

(52) U.S. Cl.
CPC .................. *G06F 16/248* (2019.01)

(58) Field of Classification Search
CPC .................................... G06F 16/248
USPC .................................. 707/600–899
See application file for complete search history.

(56) References Cited

U.S. PATENT DOCUMENTS

| | | | |
|---|---|---|---|
| 9,244,899 B1* | 1/2016 | Greenbaum | G06F 40/177 |
| 10,341,430 B1* | 7/2019 | Badawy | G06F 16/906 |
| 10,621,762 B2 | 4/2020 | Donalek et al. | |
| 11,481,939 B2 | 10/2022 | Indurkhya et al. | |
| 2005/0097108 A1* | 5/2005 | Wang | G06F 16/284 |
| 2016/0337366 A1* | 11/2016 | Wright | G06F 16/113 |
| 2017/0323028 A1* | 11/2017 | Jonker | G06F 16/9024 |
| 2019/0317939 A1* | 10/2019 | Caroli | G06F 16/2264 |
| 2021/0042338 A1* | 2/2021 | Smutko | G06F 11/3438 |
| 2021/0232616 A1* | 7/2021 | Fauber | G06Q 30/018 |
| 2021/0233295 A1 | 7/2021 | Indurkhya et al. | |

OTHER PUBLICATIONS

"Applications of Network Graphs", Virtualitics, Retrieved from: https://docs.virtualitics.com/network-graphs/applications, Retrieved on 2022.

(Continued)

*Primary Examiner* — Michelle N Owyang
(74) *Attorney, Agent, or Firm* — KPPB LLP (57) ABSTRACT

Systems and methods for network explainability in accordance with embodiments of the invention are illustrated. In many embodiments, network structures are extracted from tabular data structures. Communities within the network structure can be identified and processed to generate rules that explain relationships in the underlying data. In various embodiments, the rules are translated into natural language for presentation to a user.

20 Claims, 9 Drawing Sheets

(56) References Cited

OTHER PUBLICATIONS

"Louvain Method", Wikipedia, Retrieved from: https://en.wikipedia.org/wiki/Louvain_method, last edited: Jul. 25, 2023, 4 pgs.
"Using VIP's Network Extractor on ETF Data", printed Apr. 12, 2022, https://static.helpjuice.com/helpjuice_production/uploads/upload/imate/10173/direct/1646250336301-Network Extractor with Exchange Traded Funds, 3 pgs.
Bertsimas et al., "Interpretable clustering: an optimization approach", Machine Learning, vol. 110, 2021, pp. 89-138.
Quinlan, "Induction of decision trees", Machine Learning, vol. I, 1986, pp. 81-106.
Vazquez, "6.034 Recitation 7: KNN and ID Tree Notes", YouTube, Uploaded Oct. 24, 2020.
Wikipedia, "Giant Component", printed Apr. 12, 2022 from https://en.wikipedia.org/wiki/Giant_component, 4 pgs.
Wikipedia, "C4.5 algorithm", printed Apr. 8, 2022 from https://en.wikipedia.org/wiki/C4.5_algorithm, 3 pgs.
Wikipedia, "Decision tree pruning", printed Apr. 12, 2022 from https://en.wikepedia.org/wiki/Decision_tree pruning, 4 pgs.
Wikipedia, "ID3 algorithm", printed Apr. 12, 2022 from https://en.wikipedia.orgwoloID3_algorithm, 5 pgs.

\* cited by examiner

| University | Username | Pet Type | Spend ($) | Community |
|---|---|---|---|---|
| Caltech | Aaka$h | Dog | 300 | 1 |
| USC | Benjamin15 | Dog | 289 | 2 |
| USC | Benjamin15 | Cat | 141 | 2 |
| USC | Benjamin15 | Rabbit | 500 | 2 |
| USC | c4therine | Dog | 350 | 2 |
| USC | c4therine | Rabbit | 450 | 2 |
| Caltech | David3000 | Cat | 600 | 1 |
| Caltech | David3000 | Rabbit | 469 | 1 |
| USC | Elizab3th | Rabbit | 225 | 2 |

FEATURE  FEATURE  TARGET

SYSTEMS AND METHODS FOR NETWORK EXPLAINABILITY

CROSS-REFERENCE TO RELATED APPLICATIONS

The current application claims priority under 35 U.S.C. 119(e) to U.S. Provisional Patent Application Ser. No. 63/218,201, entitled "Systems and Methods for Network Explainability", filed Jul. 2, 2021, and U.S. Provisional Patent Application Ser. No. 63/235,082, entitled "Network Explainability", filed Aug. 19, 2021. The disclosure of U.S. Provisional Patent Application Ser. Nos. 63/218,201, and 63/235,082 are incorporated herein by reference in its entirety.

FIELD OF THE INVENTION

This invention generally relates to the visualization of data, and to the explaining networks detected within datasets.

BACKGROUND

Three-dimensional (3D) computer graphics are graphics that use a three-dimensional representation of geometric data stored in memory for the purposes of performing calculations and rendering 2D images. Conventional computer displays are capable of rendering a 2D image that gives the appearance of depth. Recently, Virtual Reality (VR) and Augmented Reality (AR) devices have been developed that simulate depth using stereoscopy, where different viewpoints of the same scene are displayed to the left and right eyes, such as the Vive, by HTC, or the Oculus Rift, by Oculus VR.

Data visualization using computer systems involves displaying data as a graphical representation of the data and is an important tool for data analysis. 3D computer graphic techniques have recently been used to try and represent large data sets in ways that are understandable by human users. Virtual reality has begun to be used to present 3D data to users.

Network Graphs (sometimes simply referred to as "networks" or "graphs") are a way of representing things and the relationships that exist between them. Networks are made of nodes and edges. Nodes can represent things from tangible objects to abstract ideas. Edges represent the relationships between nodes. Edges can have a weight which represent the strength of the relationship between the two nodes the edge connects.

SUMMARY OF THE INVENTION

Systems and methods for network explainability in accordance with embodiments of the invention are illustrated. One embodiment includes a data visualization system for explaining network structures in data, including a processor, and a memory, where the memory contains a data visualization application that configures the processor to: obtain a tabular database including a plurality of rows, and a plurality of columns, extract a network representation of the tabular database, where the network representation includes a plurality of nodes, where each node in the plurality of nodes represents a unique value in a target column in the plurality of columns, and a plurality of edges, where each edge connects two nodes in the plurality of nodes and reflects a shared value in one or more associative columns in the plurality of columns, identify communities within the network representation, add a community column to the tabular database, where values for each row in the community column indicate the community to which that row belongs, recursively, until a predefined breakpoint is hit: construct a tree structure for each associative column by partitioning the identified community column values into each tree structure, calculate a branch disorder value for each branch of each tree structure, calculate whole-tree disorder for each tree structure based on the calculated branch disorder values, partition the community column values into branches of the tree having the lowest whole-tree disorder, extract a plurality of explanatory rules based on the traversal of the resulting tree having the lowest whole-tree disorder, and provide the plurality of explanatory rules.

In another embodiment, the predefined breakpoint occurs when the tree having the lowest whole-tree disorder is homogenously partitioned.

In a further embodiment, the predefined breakpoint occurs at a preset limit on recursions.

In still another embodiment, the preset limit on recursions is between 2 and 5 recursions.

In a still further embodiment, the data visualization application further configures the processor to translate the plurality of explanatory rules into natural language.

In yet another embodiment, the data visualization application further configures the processor to: identify dense community intraconnections for each identified community, and provide a feature which most densely connects a given identified community as an explanation of the given identified community.

In a yet further embodiment, to identify dense community intraconnections, the data visualization application further configures the processor to calculate the relative edge density for each identified community.

In another additional embodiment, to identify dense community intraconnections, the data visualization application further configures the processor to calculate the normalized relative edge density for each identified community.

In a further additional embodiment, the identified communities are Louvain communities.

In another embodiment again, the explanations are provided along with a visualization of the network structure.

In a further embodiment again, a data visualization method for explaining network structures in data, includes obtaining a tabular database including a plurality of rows, and a plurality of columns, extracting a network representation of the tabular database, where the network representation includes a plurality of nodes, where each node in the plurality of nodes represents a unique value in a target column in the plurality of columns, and a plurality of edges, where each edge connects two nodes in the plurality of nodes and reflects a shared value in one or more associative columns in the plurality of columns, identifying communities within the network representation, add a community column to the tabular database, where values for each row in the community column indicate the community to which that row belongs, recursively, until a predefined breakpoint is hit: constructing a tree structure for each associative column by partitioning the identified community column values into each tree structure, calculating a branch disorder value for each branch of each tree structure, calculating whole-tree disorder for each tree structure based on the calculated branch disorder values, partitioning the community column values into branches of the tree having the lowest whole-tree disorder, extracting a plurality of explanatory rules based on the traversal of the resulting tree having the lowest whole-tree disorder, and providing the plurality of explanatory rules.

In still yet another embodiment, the predefined breakpoint occurs when the tree having the lowest whole-tree disorder is homogenously partitioned.

In a still yet further embodiment, the predefined breakpoint occurs at a preset limit on recursions.

In still another additional embodiment, the preset limit on recursions is 3 recursions.

In a still further additional embodiment, the method further includes translating the plurality of explanatory rules into natural language.

In still another embodiment again, the method further includes identifying dense community intraconnections for each identified community, providing a feature which most densely connects a given identified community as an explanation of the given identified community.

In a still further embodiment again, identifying dense community intraconnections includes calculating the relative edge density for each identified community.

In yet another additional embodiment, identifying dense community intraconnections includes calculating the normalized relative edge density for each identified community.

In a yet further additional embodiment, the identified communities are Louvain communities.

In yet another embodiment again, the explanations are provided along with a visualization of the network structure.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DESCRIPTION 3D data visualization systems are built to enable users to understand their data in intuitive, visual ways. By interacting with data visually, the human mind is capable of using its significant pattern recognition abilities to make sense of data. However, 3D rendering, and especially rendering images for Virtual Reality (VR), Augmented Reality (AR), and Mixed Reality (MR) systems takes a significant amount of computing power. In the age of Big Data, data sets that are increasingly large and complex are becoming both invaluable and readily available. However, as the complexity and volume of a dataset increases, so too does the processing power required to visualize and interpret the data.

This issue presents multiple challenges for the effective usage and visualization of data, many of which are discussed in U.S. Pat. No. 10,621,762, entitled "Systems and Methods for High Dimensional 3D Data Visualization", granted Apr. 14, 2020, and U.S. patent application Ser. No. 17/157,819, entitled "Systems and Methods for 3D Data Visualization and Network Extraction", filed Jan. 25, 2021. The entirety of both U.S. Pat. No. 10,621,762 and U.S. patent application Ser. No. 17/157,819 are hereby incorporated by reference. While visualization of data as a network or graph can be itself useful to a viewer, systems and methods described herein can provide natural language explanations of the underlying structure of a graph, e.g. why nodes in the graph are where they are. These explanatory tools can automate the process of understanding datasets which are often too large and complex for humans to reliably parse on any reasonable timescale.

In many embodiments, data visualization systems use a network extractor tool to create a network representation of a data set. The network representation can then be further processed by generating greedy decision trees which, after creation, contain paths which reflect predictive rules for any record in the dataset or an arbitrary newly added record. In many embodiments, irrespective of complexity, these paths can be represented as a logical rule, and the logical statement can be translated into natural language. Data visualization systems are described in further detail below.

Data Visualization Systems

Data visualization systems can be implemented using a variety of architectures, from single computing devices to distributed computing systems. In numerous embodiments, multiple user interface devices can be connected to enable multiple users to interact with the data and with each other in a virtual environment. In many embodiments, the distribution of computational activity is dependent upon the number of users interacting with the visualization.

Figure 1:
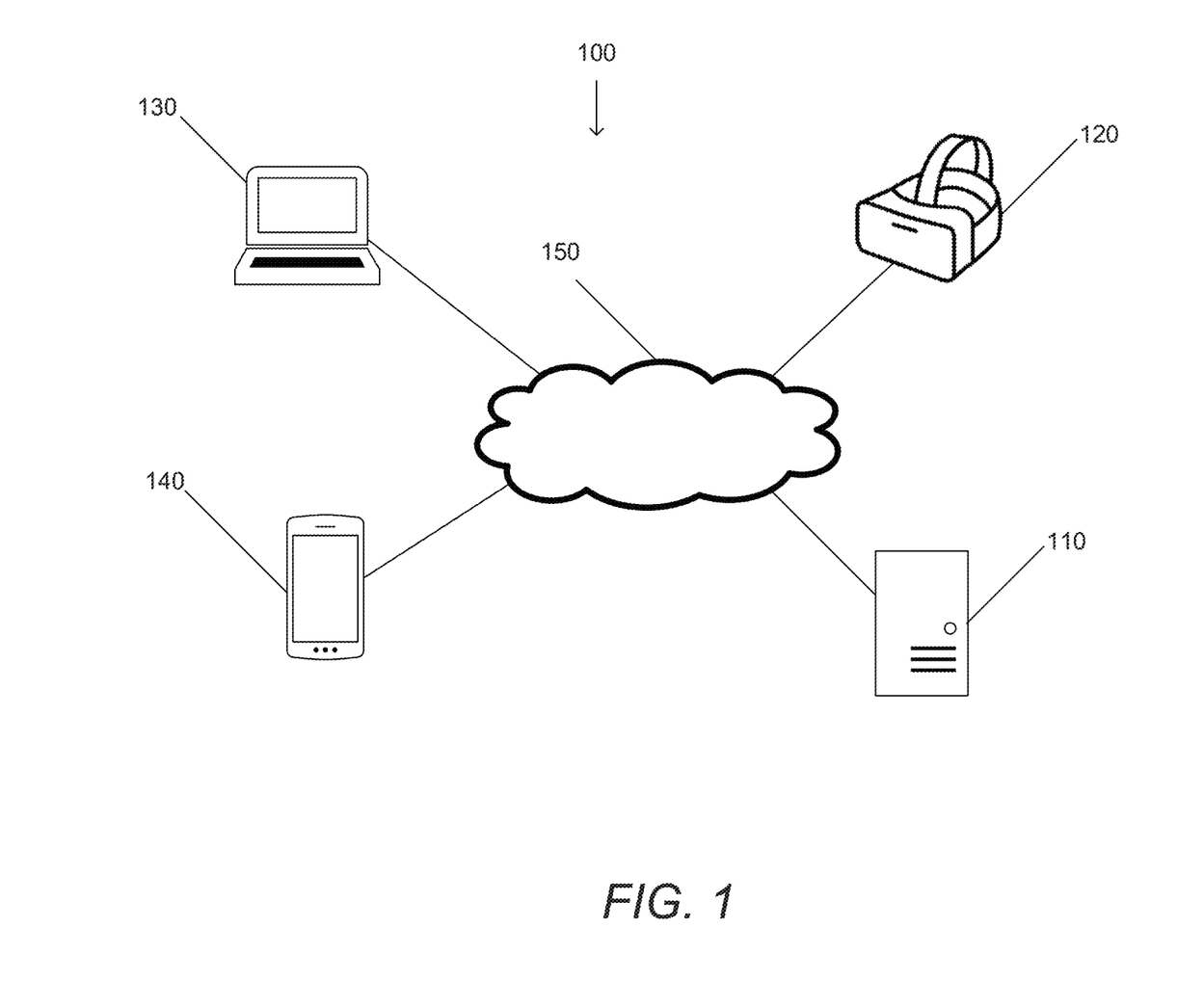
FIG. 1 is a network diagram for a data visualization system in accordance with an embodiment of the invention.

A data visualization system in accordance with an embodiment of the invention is illustrated in FIG. 1. Data visualization system 100 includes a data visualizer 110. Data visualizers can be implemented using a variety of different hardware. For example, personal computers, servers, server systems (e.g. cloud computing architectures), could be used as a data visualizer. In numerous embodiments, data visualizers can leverage distributed computer hardware. Data visualizers can perform data visualization processes including, but not limited to, those discussed in below sections. Data visualization processes are not restricted to those which create a graphical representation of the data, but also can refer to explanatory processes which produce text-based representations of the data such as explanations of a visualization and/or other summaries of the data.

Data visualization system 100 further includes a number of user interface devices, such as a VR display 120, a computer terminal 130, and smartphone 140. Example VR displays can be, but are not limited to, VR headsets such as the Oculus Rift, HTC Vive, or the Google Cardboard, AR displays such as the Microsoft Hololens, and/or MR displays such as Windows Mixed Reality Headsets. In many embodiments, user interface devices include a display capable of rendering high dimensional data in accordance with data visualization processes. In a variety of embodiments, user interface devices enable users to set visualization parameters, manipulate the view point of the visualization, and/or access generated insights. Data visualization systems can provide different viewpoints of the same visualization to each connected user interface device, and/or provide the same viewpoint to two or more user interface devices.

Data visualizer 100 is connected to interface devices via a network 150. Network 150 can be a wired network, a wireless network, or a combination of both wired and wireless networks. In many embodiments, networks include (but are not limited to) wide area networks, local area networks, personal area networks, the Internet, or any other communication protocol and/or network architecture as appropriate to the requirements of specific applications of embodiments of the invention.

As can be readily appreciated, any number of architectures can be used, such as, but not limited to, architectures that involved distributed computing platforms, different numbers of user interface devices, and/or any other implementation that may be appropriate to the requirements of a given application. Data visualizers are discussed in further detail below.

Data Visualizers

As noted above, data visualizers are capable of performing data visualization processes, including explanatory processes. While below is a discussion of an exemplary data visualization system implemented using a single computing device, in numerous embodiments, Data visualizers are implemented using distributed architectures. The specific architecture can change based on the processing power required and the number of users that are designed to interact with the system.

Figure 2:
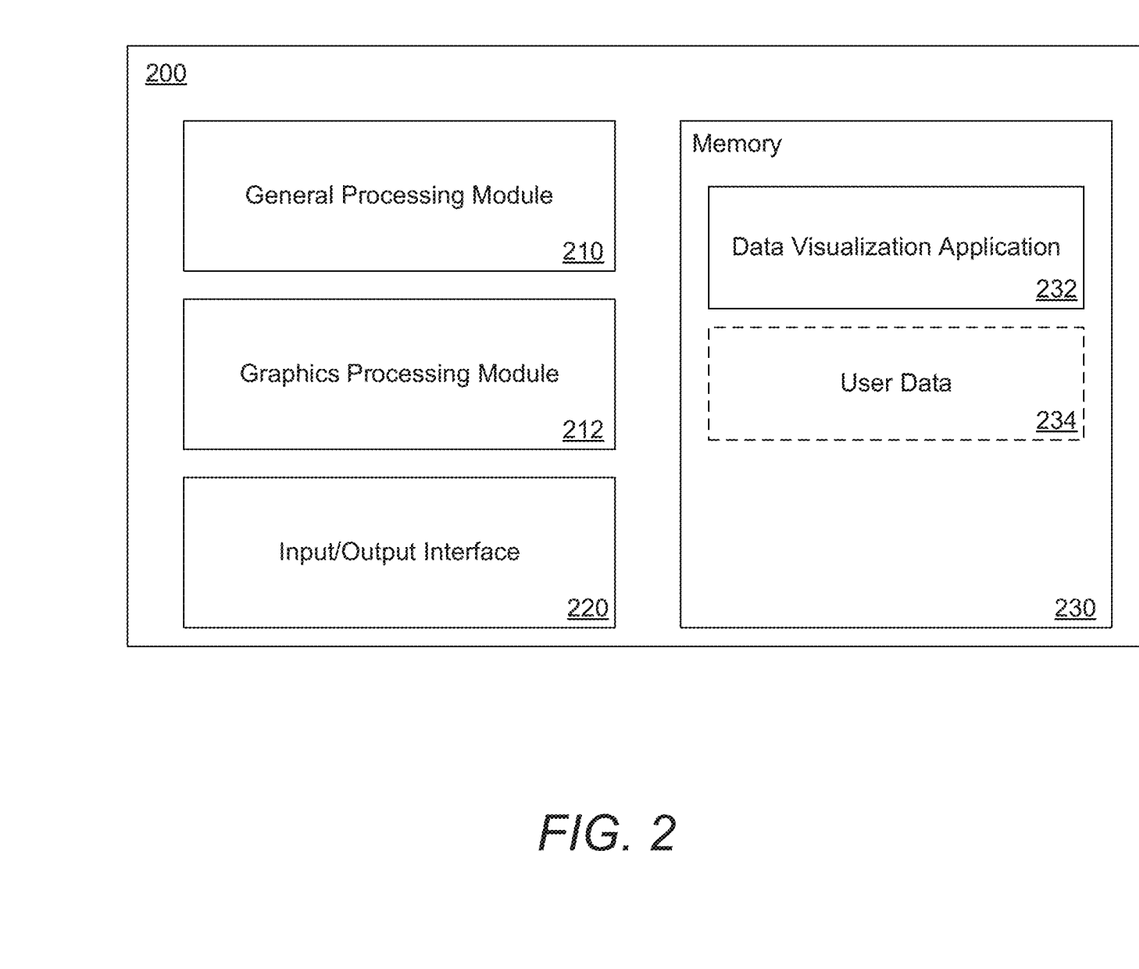
FIG. 2 conceptually illustrates a data visualization system implemented on a single computing device in accordance with an embodiment of the invention.

A data visualizer implemented on a single computing device in accordance with an embodiment of the invention is illustrated in FIG. 2. Data visualizer 200 includes a generic processing module 210 and a graphics processing module 212. In numerous embodiments, generic processing modules are general purpose processors such as a Central Processing Unit (CPU). Graphics processing modules are processors architected to excel at numerous, parallelizable functions such as rendering images including, but not limited to, GPUs. In some embodiments, generic processing module 210 and graphics processing module 212 can be implemented using the same processing circuitry and/or using more than two processing components. As can readily be appreciated, Data visualizers can take advantage of the capabilities of different processor configurations to optimize computational resources.

Data visualizer 200 includes an input/output (I/O) interface 220. I/O interface can connect to user interface devices such as a VR headset, or a 2D display. In numerous embodiments, displays can be completely integrated into the data visualizer. In many embodiments I/O interfaces enable communications with distributed computing hardware, the acquisition of user data to visualize, and/or obtaining visualization parameters. As can be readily appreciated, any number of I/O circuitries can be used, including multiple types of I/O interfaces that are specialized for communication with different types of devices.

Data visualizer 200 further includes a memory 230. Memory 230 can be any type of memory, such as (but not limited to) volatile memory, non-volatile memory, or any combination thereof. Memory 230 contains a data visualization application 232. Data visualization applications can configure generic processing modules and graphics processing modules to perform data visualization processes. In many embodiments, data visualization applications can determine what hardware is available, and optimize performance of the data visualization application by utilizing specialized data structures that can take advantage of different hardware. Memory 230 can further include user date 234 acquired from a user interface device. As can be readily appreciated, additional memory can be incorporated into the system. For example, in various embodiments, the GPU may have dedicated memory separate from memory 230 such as (but not limited to) video random access memory (VRAM). In some embodiments, the GPU may have a dedicated portion of memory 230.

As can readily be appreciated, any number of system designs can be used to enable a computer system to perform a data visualization processes. For example, in numerous embodiments, Data visualizers may include multiple generic processing modules and/or graphics processing modules. Data visualization processes for explaining networks are discussed in further detail below.

Network Explanation

Networks have information encoded within their structure. However, what the structure means is not always immediately clear. For example, certain data points may be spatially clustered together, but (especially with high dimension data) it might not be clear why these data are clustered together. Processes described herein attempt to computationally comprehend the structure of the network and provide a natural language explanation of it to a human user.

Figure 3:
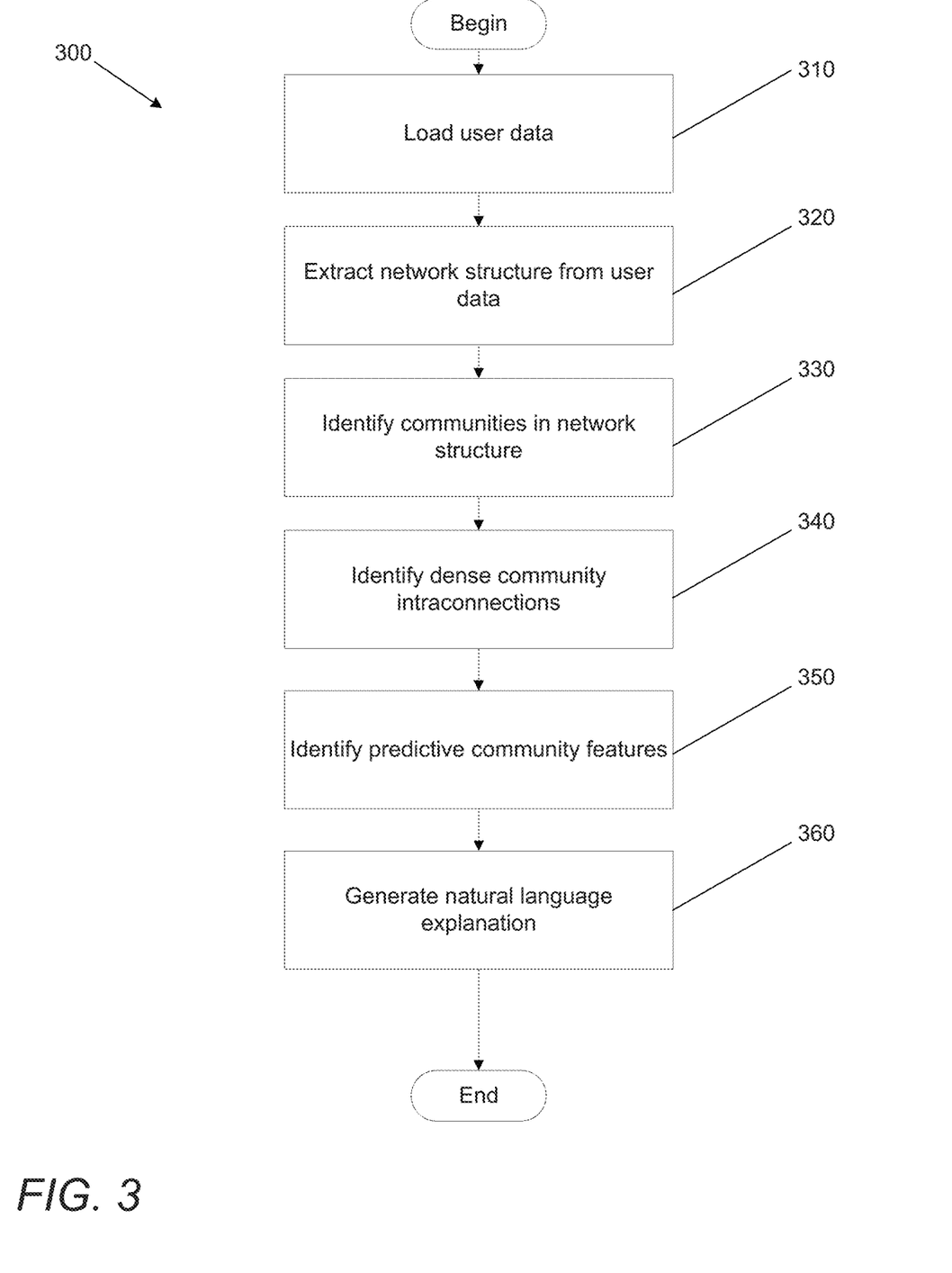
FIG. 3 is a flowchart illustrating a network explanation process in accordance with an embodiment of the invention.

Turning now to FIG. 3, a process for generating a natural language explanation of a network structure in accordance with an embodiment of the invention is illustrated. Process 300 includes loading (310) user data. In numerous embodiments, user data is tabular, having many rows and columns. Columns, or "dimensions," represent a specific type of value. Rows, or "records," are data entries that have values for at least one of the dimensions. Typically, almost all, if not all, dimensions are populated per record, although it is not a requirement. Further, data might be input in a different format, e.g. as a graph, or even already as a network. If a network is not already obtained, a network structure is extracted (320) from the user data. In numerous embodiments, this is achieved using a network extractor tool such as those described in U.S. patent application Ser. No. 17/157,819 referenced and incorporated above.

The network structure is used to identify (330) communities. In many embodiments, a new column can be added to the user data that stores the assigned community of each record. The community column can be referred to as a "target" to explain, and the "associative columns" from which nodes in the network were generated are now referred to as "feature columns" or "features". The "features" will be used to explain the target. That is, after the instant process is complete, by knowing the feature values for an arbitrary record, then the target value can be predicted.

Once communities have been identified, dense community intraconnections, (i.e. edges that most densely connect each community to itself rather than to the rest of the network) are identified (340). In numerous embodiments, this is achieved by calculating relative edge density (RED). RED conceptually defined as for each feature-value pairing, identify the proportion of edges in each community that correspond to that feature value. Put another way, how intraconnected a particular community is along a specific feature-value can be measured by tallying the edges where the pair of connected nodes is within the community of interest (intra-community edges). Next, how many edges corresponding to that same feature value either connect nodes in that community to nodes outside of it, or connect pars of nodes entirely outside the community (inter-community edges). In some embodiments, the tallies are optionally normalized depending on the downstream need. Normalization can be implemented using an $L^2$ normalization on both intra- and inter-community edges with respect to all edges in the network, and then dividing by the normalized count of intracommunity edges by the normalized count of intercommunity edges. This is formalized as:

$$RelativeEdgeDensity(c_i) = \frac{\|IntraCommunityEdges(c_i)\|_2}{\|InterCommunityEdges(c_i)\|_2}$$

An alternative formulation of RED, referred to as Normalized RED (NRED) which cannot exceed 1.0, and does not rely on the application of an $L^2$ normalization is formalized as:

$$NormRelativeEdgeDensity(c_i) = $$

$$\frac{IntraCommunityEdges(c_i)}{InterCommunityEdges(c_i) + IntraCommunityEdges(c_i)}$$

In many embodiments, once RED is calculated for each community at the feature level, feature values that yielded maximum RED values along with the frequency in that particular community are tabulated and stored.

Process 300 further includes identifying (350) predictive community features. In many embodiments, RED and/or NRED are used to generate high-level explanations. The identified feature values which yield maximum RED for a particular community can provide some amount of insight into which features are most impactful in the clustering. In various embodiments, a more detailed identification takes place using greedy decision trees which is discussed in further detail with respect to FIG. 4, below. Identifying predictive community features can include identifying a set of one or more rules which define, for an arbitrary record having an arbitrary set of feature values, which community said record would be assigned to. These rules are used to generate (360) a natural language explanation of the communities. Natural language explanations based on RED/NRED can include highlighting features which are most impactful in the clustering. In various embodiments, template language can be used where impactful features are socketed into a template statement.

As can readily be appreciated, RED and/or greedy decision tree approaches can be used as the foundation for generating natural language explanations using natural language processes. Further, as can be readily appreciated, network extraction methodologies that generate communities may technically differ without departing from the scope or spirit of the invention. As calculation of RED/NRED and construction of greedy decision trees are not reliant upon each other, these tasks can be performed at the same time. Further, in many embodiments, only one of RED/NRED or greedy decision trees are constructed, rather than both steps being performed. In such situations, the natural language explanations are generated based only on the performed step.

RED and NRED can provide meaningful insights with respect to a community when the statistics of feature values the points take on in that community deviate beyond the statistics of feature values in the general dataset. However, in some situations, RED does not easily describe unforeseen records, and to which communities they may belong. A greedy decision tree approach is described which generates a natural language (e.g. plain English) description of the rules that would lead any data point, new or otherwise, to fall into a given community. Greedy decision trees can leverage the Louvain Communities produced by the network extraction. Conceptually, these Louvain Communities can be thought of as the output of an unsupervised clustering algorithm where the clustering was performed on categorical data. In order to explain what may have led to those clusters, a greedy decision tree that uses categorical features to predict to which cluster a given point may belong can be constructed.

Figure 4:
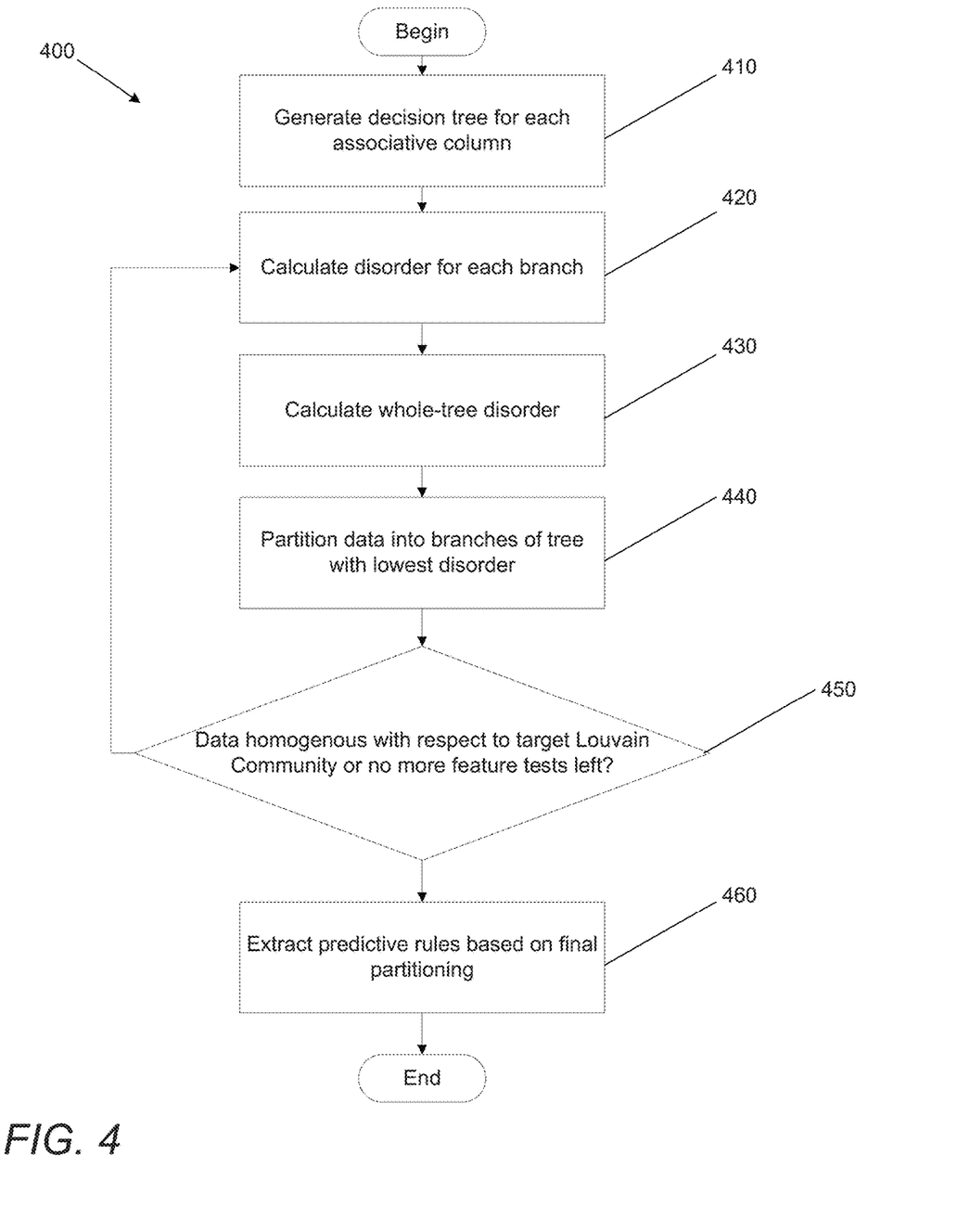
FIG. 4 is a flowchart illustrating a network explanation process for extracting predictive rules using a greedy decision tree approach in accordance with an embodiment of the invention is illustrated.

Turning now to FIG. 4, a process for extracting predictive rules using a greedy decision tree approach in accordance with an embodiment of the invention is illustrated. Process 400 includes generating (410) a decision tree for each associative column used to generate the network in the user data. In many embodiments, each associative column used to generate the network is taken as a feature test ($t_i$) and the user data is partitioned throughout the branches ($b_j$) of each tree, where each branch is a unique value found in the original associative column.

Disorder is calculated (420) for each branch: BranchDisorder($b_j$), formalized as:

$$Disorder(b_j) = -\sum_{l=0}^{M} \frac{points(c_l)}{points(b_j)} * \log_M\left(\frac{points(c_l)}{points(b_j)}\right)$$

Whole-tree disorder is then calculated (430) based on BranchDisorder for each branch: TestDisorder($t_i$), formalized as:

$$TestDisorder(t_i) = -\sum_{j=0}^{K} \frac{points(b_l)}{points(t_j)} * Disorder(b_j)$$

TestDisorder can be interpreted as the weighted average of all the BranchDisorders of a given feature test, where the weighting is the number of points that particular branch has with respect to all the points throughout the tree. The feature test with the lowest test disorder is selected and the data is partitioned (440) into each of its branches. The above steps are recursively applied on the data subset at each of the selected test's branches until (450) all of the data points are perfectly homogenous with respect to the target Louvain Community column, or until there are no more feature tests left to be applied. The resulting greedy decision tree from this recursive process can be used to place any arbitrary record into a community by following its path down the tree. These paths are extracted (460) as predictive rules, which can be represented in natural language. For example, a natural language explanation may be something similar to "Community 1 contains users who are between the ages of 45-50, and are dentists, but not married." As can be readily appreciated, the rules themselves and their specific conversion to natural language are highly dependent upon the particular data set. Indeed, the form of the natural language may also be dependent upon user preference, but all navigation of the tree can be logically expressed, and therefore converted into natural language form as a series of one or more logical statements.

As can readily be appreciated, explanations based on RED and explanations based on greedy decision trees provide different information to an end user, and therefore in many embodiments, either one may not be performed depending on the particular use case. RED-based explanations typically provide a higher-level explanation of different communities, whereas greedy decision trees provide explicit rules for how arbitrary records would be classified. Furthermore, the above processes can be modified depending on the desires of the user. In various embodiments, an additional halting condition for constructing greedy decision trees (besides homogeneity and having no more feature tests) is a threshold level of recursion which, once met, halts the recursive process. In numerous embodiments, this threshold level is set at between 3-5 levels, as any more recursive depth can lead to logical rules that when converted to natural language are unhelpful to humans due to their complexity. However, the threshold level can be set at any level, higher or lower, with resulting rules being more or less precise, respectively, but also potentially more or less complex, respectively.

Figure 5A:
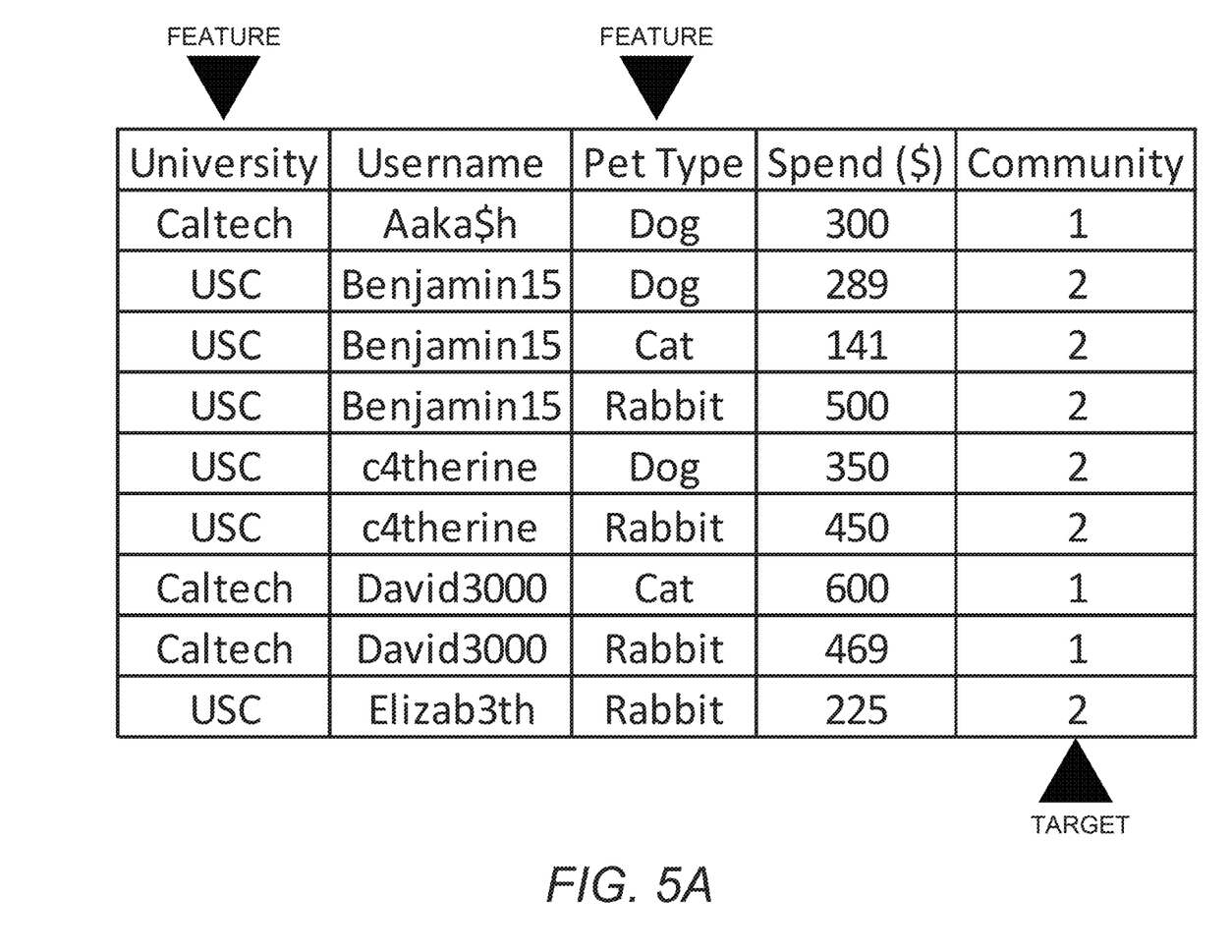
FIGS. 5A-E graphically a network explanation process for extracting predictive rules using a greedy decision tree approach on an example data set in accordance with an embodiment of the invention.
Figure 5B:
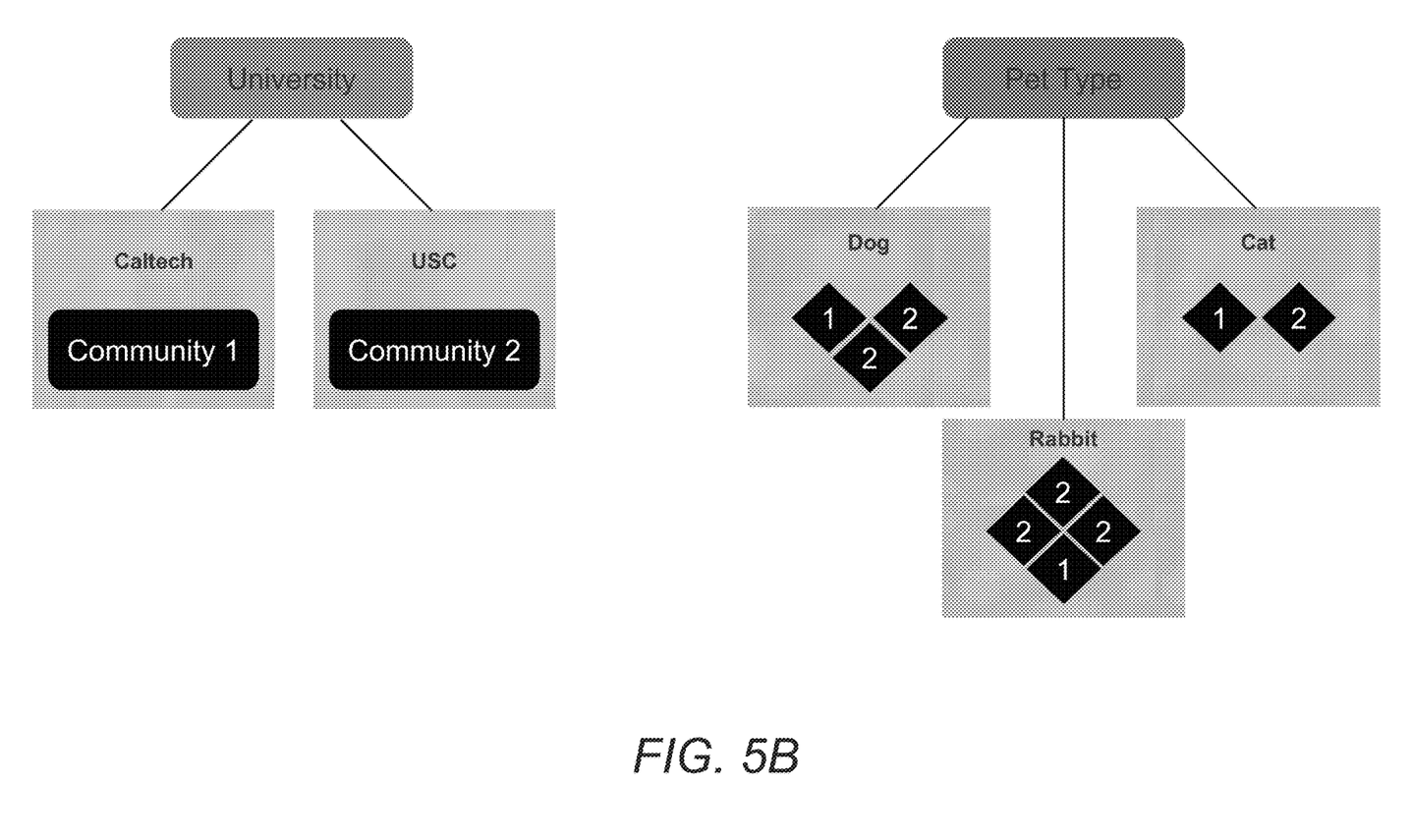
Figure 5C:
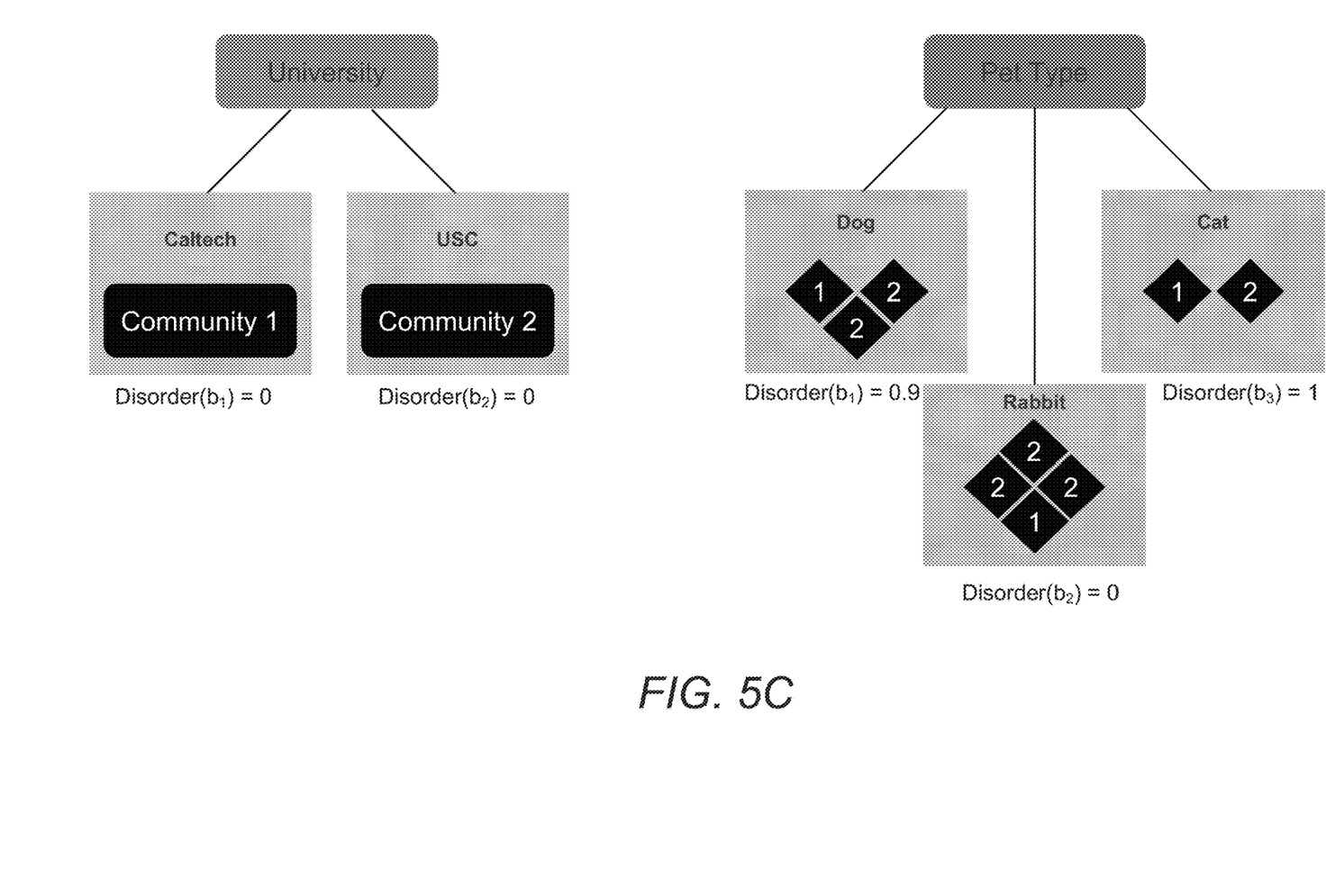
Figure 5D:
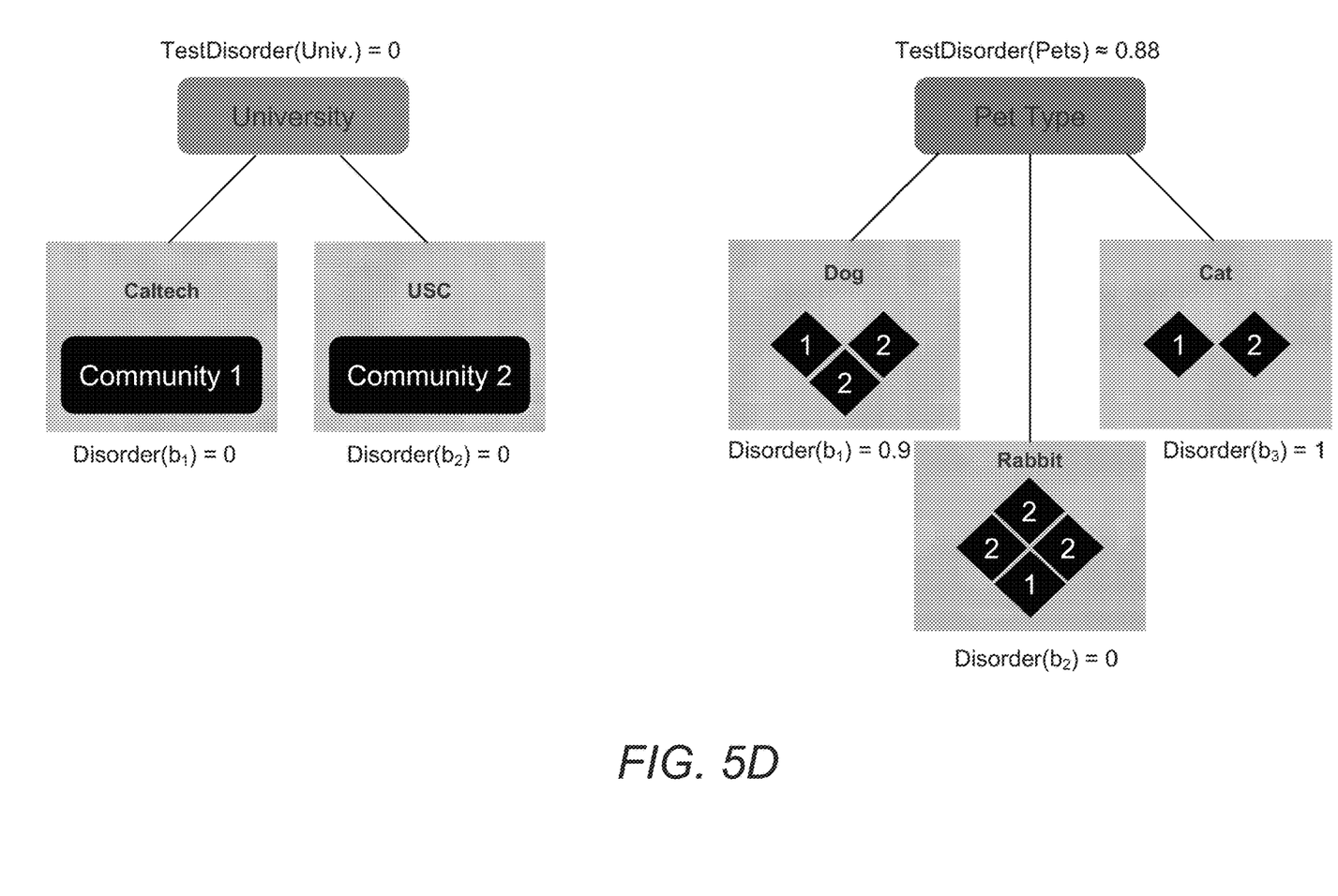
Figure 5E:
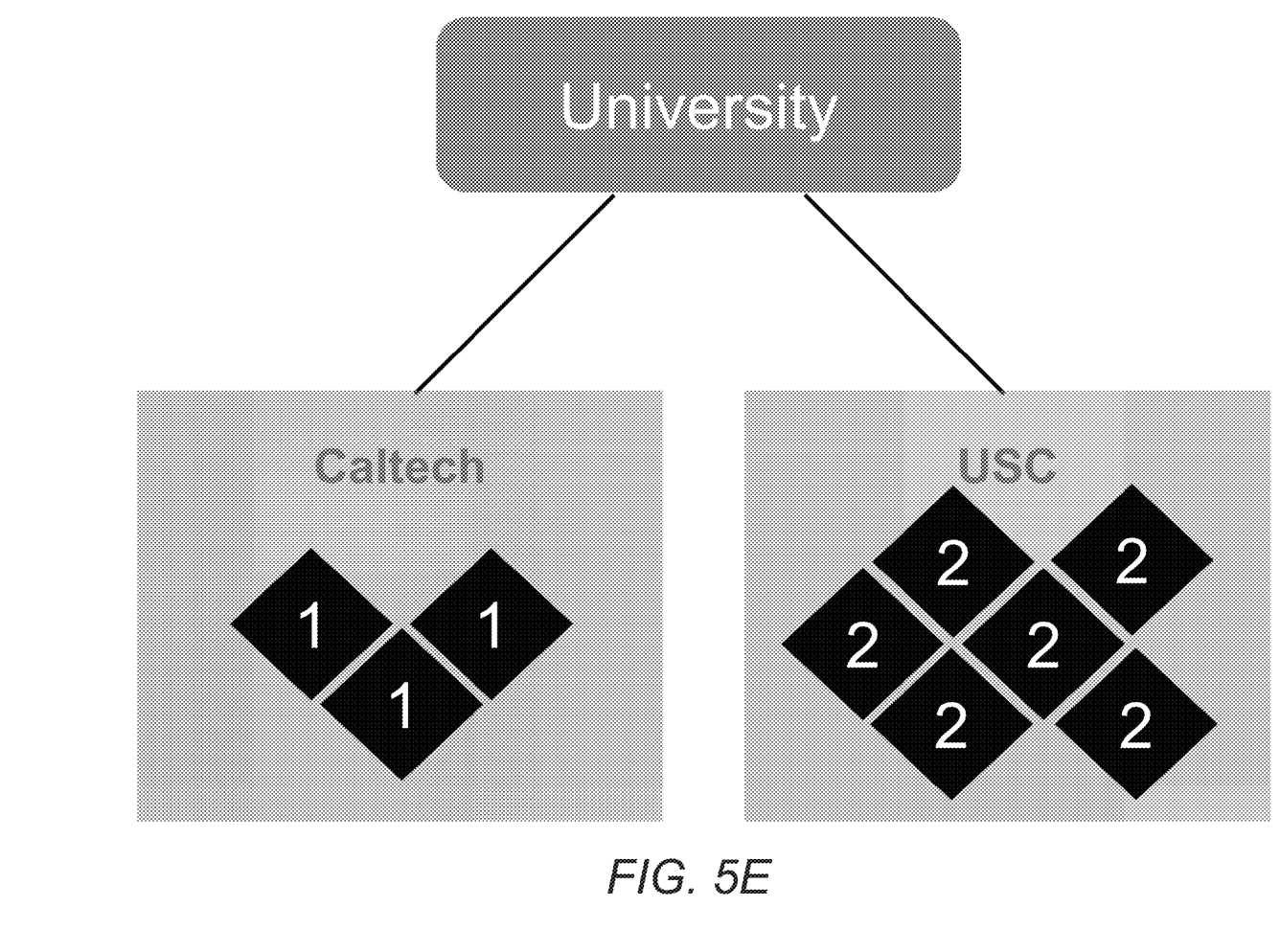

This process is graphically represented in FIGS. 5A-E. FIG. 5A shows example tabular data having 4 original dimensions and an extracted community column. The categorical values of "University" and "Pet Type" have been selected as the feature columns, and the community assignment is the target column. Trees are generated and shown in FIG. 5B for each associated feature, and BranchDisorder values are shown for each branch in FIG. 5C. The TestDisorder is calculated and shown for each tree in FIG. 5D. The data is partitioned into the lowest disorder tree, "University," illustrated in FIG. 5E. While in the instant example, there is another feature test that could be applied ("Pet Type"), the data is homogenous and therefore the recursive process ends. The explanatory rule in this simple example is now clear, as community 1 contains users who studied at Caltech, and community 2 contains users who studied at USC. As can be readily appreciated, a much higher dimensionality dataset may yield much more complicated rules and use multiple recursions before a halting condition is met.

Although specific systems and methods for explaining network structures are described herein, many different system architectures and methods can be implemented in accordance with many different embodiments of the invention. It is therefore to be understood that the present invention may be practiced in ways other than specifically described, without departing from the scope and spirit of the present invention, for example, by performing steps in the processes in different orders, in parallel, and/or with added, subtracted, and/or substitute steps. Thus, embodiments of the present invention should be considered in all respects as illustrative and not restrictive. Accordingly, the scope of the invention should be determined not by the embodiments illustrated, but by the appended claims and their equivalents.

What is claimed is:

1. A data visualization system for explaining network structures in data, comprising:
 a processor; and
 a memory, where the memory contains a data visualization application that configures the processor to:
  obtain a tabular database comprising:
   a plurality of rows; and
   a plurality of columns;
  extract a network representation of the tabular database, where the network representation comprises:
   a plurality of nodes, where each node in the plurality of nodes represents a unique value in a target column in the plurality of columns; and
   a plurality of edges, where each edge connects two nodes in the plurality of nodes and reflects a shared value in one or more associative columns in the plurality of columns;
  identify communities within the network representation;
  add a community column to the tabular database, where values for each row in the community column indicate the community to which that row belongs;
  recursively, until a predefined breakpoint is hit:
   construct a tree structure for each associative column by partitioning the identified community column values of respective associative columns into each respective tree structure;
   calculate a branch disorder value for each branch of each tree structure;
   calculate whole-tree disorder for each tree structure based on the calculated branch disorder values;
   partition the community column values into branches of the tree having a lowest whole-tree disorder of the calculated whole tree disorders;
  extract a plurality of explanatory rules based on the traversal of the tree having the lowest whole-tree disorder of the calculated whole tree disorders; and
  provide the plurality of explanatory rules.

2. The data visualization system for explaining network structures in data of claim 1, wherein the predefined breakpoint occurs when the tree having the lowest whole-tree disorder is homogenously partitioned.

3. The data visualization system for explaining network structures in data of claim 1, wherein the predefined breakpoint occurs at a preset limit on recursions.

4. The data visualization system for explaining network structures in data of claim 3, wherein the preset limit on recursions is 3 recursions.

5. The data visualization system for explaining network structures in data of claim 1, wherein the data visualization application further configures the processor to translate the plurality of explanatory rules into natural language.

6. The data visualization system for explaining network structures in data of claim 1, wherein the data visualization application further configures the processor to:
 calculate community intraconnection density for each identified community;
 select a feature having a highest density from the calculated community intraconnection densities as an explanation of the given identified community.

7. The data visualization system for explaining network structures in data of claim 6, wherein to calculate community intraconnection density, the data visualization application further configures the processor to calculate relative edge density for each identified community.

8. The data visualization system for explaining network structures in data of claim 6, wherein to calculate community intraconnection density, the data visualization application further configures the processor to calculate normalized relative edge density for each identified community.

9. The data visualization system for explaining network structures in data of claim 1, wherein the identified communities are Louvain communities.

10. The data visualization system for explaining network structures in data of claim 1, wherein the plurality of explanatory rules are provided along with a visualization of the network structure.

11. A data visualization method for explaining network structures in data, comprising:
 obtaining a tabular database comprising:
  a plurality of rows; and
  a plurality of columns;
 extracting a network representation of the tabular database, where the network representation comprises:

a plurality of nodes, where each node in the plurality of nodes represents a unique value in a target column in the plurality of columns; and a plurality of edges, where each edge connects two nodes in the plurality of nodes and reflects a shared value in one or more associative columns in the plurality of columns;

identifying communities within the network representation;

add a community column to the tabular database, where values for each row in the community column indicate the community to which that row belongs;

recursively, until a predefined breakpoint is hit:
constructing a tree structure for each associative column by partitioning the identified community column values of respective associative columns into each tree structure;
calculating a branch disorder value for each branch of each tree structure;
calculating whole-tree disorder for each tree structure based on the calculated branch disorder values;
partitioning the community column values into branches of the tree having a lowest whole-tree disorder of the calculated whole tree disorders;
extracting a plurality of explanatory rules based on the traversal of the tree having the lowest whole-tree disorder of the calculated whole tree disorders; and
providing the plurality of explanatory rules.

12. The data visualization method for explaining network structures in data of claim 11, wherein the predefined breakpoint occurs when the tree having the lowest whole-tree disorder is homogenously partitioned.

13. The data visualization method for explaining network structures in data of claim 11, wherein the predefined breakpoint occurs at a preset limit on recursions.

14. The data visualization method for explaining network structures in data of claim 13, wherein the preset limit on recursions is 3 recursions.

15. The data visualization method for explaining network structures in data of claim 11, further comprising translating the plurality of explanatory rules into natural language.

16. The data visualization method for explaining network structures in data of claim 11, further comprising:
calculating dense community intraconnection density for each identified community;
select a feature having a highest density from the calculated community intraconnection densities as an explanation of the given identified community.

17. The data visualization method for explaining network structures in data of claim 16, wherein calculating community intraconnection density comprises calculating the relative edge density for each identified community.

18. The data visualization method for explaining network structures in data of claim 16, wherein calculating community intraconnection density comprises calculating the normalized relative edge density for each identified community.

19. The data visualization method for explaining network structures in data of claim 11, wherein the identified communities are Louvain communities.

20. The data visualization method for explaining network structures in data of claim 11, wherein the plurality of explanatory rules are provided along with a visualization of the network structure.

* * * * *